United States Patent
Virgillo

(10) Patent No.: US 10,544,029 B1
(45) Date of Patent: Jan. 28, 2020

(54) DISPENSER FOR BEVERAGE BOTTLE

(71) Applicant: Raffaele Virgillo, Champlin, MN (US)

(72) Inventor: Raffaele Virgillo, Champlin, MN (US)

( * ) Notice: Subject to any disclaimer, the term of this patent is extended or adjusted under 35 U.S.C. 154(b) by 0 days.

(21) Appl. No.: 15/731,019

(22) Filed: Apr. 7, 2017

Related U.S. Application Data

(60) Provisional application No. 62/390,776, filed on Apr. 8, 2016.

(51) Int. Cl.
| | | |
|---|---|---|
| *B67B 5/00* | (2006.01) | |
| *B67D 1/12* | (2006.01) | |
| *B67D 1/04* | (2006.01) | |
| *B67D 1/00* | (2006.01) | |

(52) U.S. Cl.
CPC .............. *B67D 1/12* (2013.01); *B67D 1/0081* (2013.01); *B67D 1/0412* (2013.01); *B67D 2001/0087* (2013.01); *B67D 2001/0094* (2013.01)

(58) Field of Classification Search
CPC ...... B67D 1/12; B67D 1/0412; B67D 1/0081; B67D 2001/0094; B67D 2001/0087
See application file for complete search history.

(56) References Cited

U.S. PATENT DOCUMENTS

| | | | | |
|---|---|---|---|---|
| 2,131,860 A | * | 10/1938 | Schwabenlender | F16N 37/02 141/391 |
| 2,283,652 A | * | 5/1942 | Schwarzkopf | B67D 3/02 137/312 |
| 2,465,894 A | * | 3/1949 | Mallick | B65D 47/061 222/482 |
| 2,792,018 A | * | 5/1957 | Turak | B01F 3/04829 137/614.17 |
| 3,033,247 A | * | 5/1962 | Beall, Jr. | B67D 3/02 141/308 |
| 3,235,133 A | * | 2/1966 | Zimmerman | B65D 47/06 222/189.06 |
| 3,256,916 A | * | 6/1966 | Silletti | B67C 11/04 141/100 |
| 3,585,963 A | * | 6/1971 | Hiszpanski | G01P 13/008 116/206 |
| 3,845,787 A | * | 11/1974 | Slagle | B67D 1/102 137/571 |
| 4,204,613 A | * | 5/1980 | Terzian | B67D 3/0009 165/163 |
| 4,473,174 A | * | 9/1984 | Heuser | C12H 1/16 222/152 |
| 4,595,121 A | * | 6/1986 | Schultz | B01F 5/0413 116/DIG. 8 |
| 5,186,358 A | * | 2/1993 | McVay | B67C 11/02 141/332 |

(Continued)

FOREIGN PATENT DOCUMENTS

WO WO-2014101720 A1 * 7/2014 ............ B01F 5/0428

*Primary Examiner* — David P Angwin
*Assistant Examiner* — Bob Zadeh
(74) *Attorney, Agent, or Firm* — DeWitt LLP

(57) ABSTRACT

A dispenser for dispensing a beverage from a beverage bottle, especially for dispensing wine from a wine bottle and facilitating the aeration of the dispensed wine to shorten the time normally devoted to breathing the wine. An open lesser end of the dispenser inserts into the neck of a wine bottle and preferably seals therein. A valve may be closed to temporarily preserve the wine in the bottle for later aeration while dispensing.

18 Claims, 5 Drawing Sheets

(56) References Cited

U.S. PATENT DOCUMENTS

| | | | | |
|---|---|---|---|---|
| 5,743,294 A * | 4/1998 | Donzella | | B67D 3/048 137/588 |
| 6,427,871 B1 * | 8/2002 | Suero | | B67D 1/1206 222/36 |
| 6,568,660 B1 * | 5/2003 | Flanbaum | | B65D 47/06 222/189.07 |
| 7,527,180 B2 * | 5/2009 | Allen | | B65D 47/06 222/481.5 |
| 8,011,540 B1 * | 9/2011 | Peckels | | B01F 3/04099 222/190 |
| 8,523,019 B2 * | 9/2013 | Drobot | | B01F 5/0428 222/152 |
| D720,959 S * | 1/2015 | Mok | | D7/392 |
| 9,254,944 B1 * | 2/2016 | Peckels | | B65D 25/48 |
| 2002/0079001 A1 * | 6/2002 | Blackbourn | | B67D 3/044 137/588 |
| 2008/0035598 A1 * | 2/2008 | Simons | | B01F 3/04099 215/228 |
| 2011/0036873 A1 * | 2/2011 | Peckels | | B67D 3/0045 222/476 |
| 2011/0226809 A1 * | 9/2011 | Malo | | B65D 47/06 222/83.5 |
| 2012/0074172 A1 * | 3/2012 | Federighi | | B01F 3/0446 222/190 |
| 2012/0211516 A1 * | 8/2012 | Zapp | | B65D 25/48 222/20 |
| 2013/0082075 A1 * | 4/2013 | Trulaske | | B67D 1/1466 222/517 |
| 2013/0122161 A1 * | 5/2013 | Cole | | C12H 1/0432 426/271 |
| 2014/0091107 A1 * | 4/2014 | Becker | | B65D 25/40 222/190 |
| 2014/0263405 A1 * | 9/2014 | Dziuk | | C12H 1/16 222/1 |
| 2015/0093485 A1 * | 4/2015 | Kornacki | | C12H 1/0416 426/442 |
| 2016/0114945 A1 * | 4/2016 | Carsello | | B65D 51/244 222/152 |
| 2016/0354733 A1 * | 12/2016 | Chung | | B67D 1/10 |

* cited by examiner ial No. 62/390,776, filed Apr. 8, 2016.

BACKGROUND OF THE INVENTION

For centuries wine has been stored in glass bottles with a cork stopper inserted in the neck of the wine bottle. Many wines benefit from "breathing" or opening the bottle and waiting a period of time prior to consuming the wine. The waiting period can be reduced by actively aerating the wine. Once allowed to breathe or actively aerated, the wine should be fairly promptly consumed lest its flavor begin to subsequently deteriorate.

BRIEF SUMMARY OF THE INVENTION

In a first embodiment, the present invention is a dispenser for dispensing a beverage from a beverage bottle having a necked opening. The dispenser includes a frustoconical body having an open lesser end and a closed greater end. The open lesser end is adapted to insert into the necked opening of the beverage bottle. A channel within the frustoconical body leads from the open lesser end to closed greater end. An inlet aperture situated between the open lesser end and the closed greater end leads through the frustoconical body to the channel. An outlet aperture adjacent the closed greater end leads through the frustoconical body from the channel. A valve is situated between the open lesser end and the inlet aperture. The valve has a first open position which maintains the channel leading from the open lesser end to the closed greater end. The valve also has a second closed position which interrupts the channel leading from the open lesser end to the closed greater end. Preferably, the body at or adjacent to the open lesser end is sheathed in a resilient frustoconical sleeve segment. The resilient frustoconical sleeve segment functions to form a seal between the body at or adjacent to the open lesser end of the dispenser and the neck of the beverage bottle into which the open lesser end may be inserted. Preferably, the beverage bottle is a wine bottle which has been freshly uncorked and is filled with wine which has yet to breathe. The dispenser with its open lesser end inserted and sealed within the neck of the wine bottle, defines a pour path for the wine to exit the wine bottle when the valve is in the first open position; that is, the wine passes from within the wine bottle, through the neck and into the dispenser body, through the channel and valve in the first open position, then exits the dispenser body through the outlet aperture adjacent the closed greater end. The dispenser, alternatively, serves as a temporary replacement closure for the wine bottle when the valve is in the second closed position, thereby substantially prevents breathing of the wine remaining in the wine bottle.

Wine dispensed through the pour path encounters air passing through the inlet aperture, from outside the dispenser body into the channel and into the pour path, to contact wine in the pour path. The newly uncorked wine and air passing into the channel from the inlet aperture mix and the incoming air encountered in the pour path causes aeration of the wine in the pour path.

Preferably, the valve is a ball valve with an actuator extending from or through the frustoconical body. The actuator serves to move and rotate the ball valve from the first open position to the second closed position or from the second closed position to the first open position. More preferably, the actuator has an indicator handle, the indicator handle provides a visual indication, as well as a tactile indication, of whether the ball valve is in the first open position or the second closed position. Most preferably, the actuator of the ball valve extends both ends of the ball valve and the indicator handle is one of a pair of indicator handles, each situated on opposite ends of the ball valves. Preferably, the inlet aperture and the outlet aperture are situated on opposite sides of the channel. More preferably, the inlet aperture and the outlet aperture are situated on opposite sides of the channel and the actuator and ball valve are situated on an axis substantially perpendicular to a plane defined by the channel, the inlet aperture and the outlet aperture. Preferably, the inlet aperture has a cross sectional area and the outlet aperture has a cross sectional area, and wherein the cross sectional area of the inlet aperture is not more than about half of the cross sectional area of the outlet aperture. Preferably, but optionally, either or both of the closed greater end or end panel of the dispenser and/or the frustoconical body adjacent the greater closed end includes indicia, such as, for example, instructions and/or advertising and/or personalized information recorded concerning the particular wine in the bottle about to be dispensed or preserved by the dispenser.

In a second embodiment, the present invention is a method of dispensing wine from a freshly uncorked wine bottle and with the bottle having an open neck. The method includes the steps of providing a wine dispenser, as described above, with a frustoconical body having an open lesser end, adapted for inserting in the wine bottle neck and a resilient frustoconical sleeve sheathing the open lesser end, and a closed greater end, a channel leading from the open lesser end to closed greater end, an inlet aperture leading to the channel, an outlet aperture leading from the channel, and a valve situated between the open lesser end and the inlet aperture. The open lesser end and resilient frustoconical sheath are inserted into the neck of the wine bottle to form a seal therebetween. The wine bottle is inverted or tipped such that wine from the newly opened wine bottle passes into a pour path, the pour path extending through the channel and thence through the outlet aperture and while passing through the pour path, the wine encounters air passing into the pour path from the inlet. The wine from the newly opened wine bottle is aerated by passing through the pour path such that the breathe time period is reduced. Most preferably, when the wine bottle is inverted or tipped, the outlet aperture is oriented generally downwardly whilst the inlet aperture is oriented generally upwardly.

Preferably, the method of dispensing also includes the step of placing the valve in the second closed position, such that the channel is interrupted and wine may not pass through the pour path and air is temporarily substantially prevented from contacting any wine remaining in the freshly opened wine bottle, allowing the wine to be temporarily preserved for later aeration and breathing. The wine bottle, with the installed dispenser having its valve in the second, closed position, may be uninverted or placed in any desired convenient storage orientation. Preferably, the method of dispensing also includes the step of placing the valve in the first open position, such that the channel is maintained and wine may pass through the pour path and incoming air from the inlet aperture aerates wine passing through the pour path. More preferably, the valve is a ball valve and has an actuator and an indicator handle on the actuator and the method also includes the steps of holding the wine bottle with the dispenser sealed thereto with a first hand and placing the valve in the second closed position by actuating the indicator handle and actuator with a second opposite hand. More preferably, the valve is a ball valve and has an actuator and an indicator handle on the actuator and the method also includes the steps of holding the wine bottle with the dispenser sealed thereto with a first hand and placing the valve in the first open position by actuating the indicator handle and actuator with a second opposite hand.

DETAILED DESCRIPTION OF THE INVENTION

Figure 1:
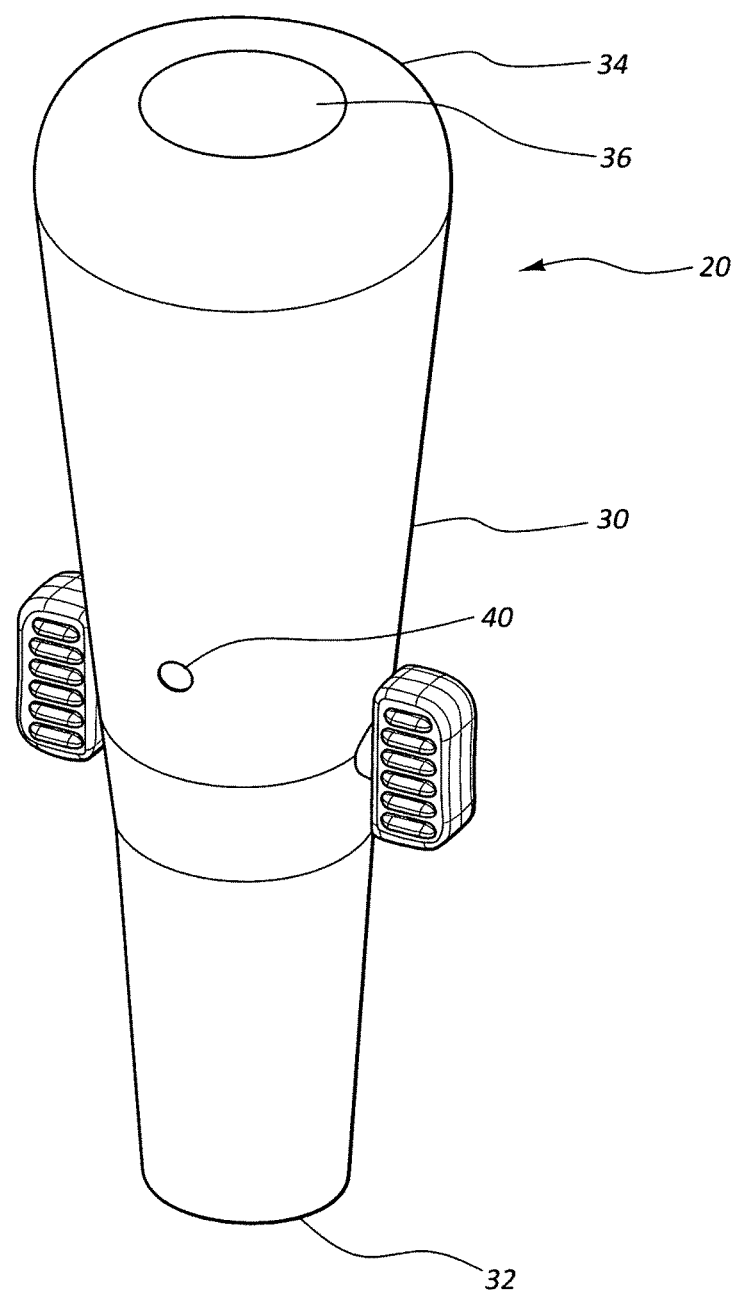
FIG. 1 schematically depicts an isometric view of a dispenser according to the present invention.

In a preferred embodiment, the present invention, dispenser 20, is shown in FIG. 1. The dispenser 20 has a frustoconical body 30 with an open lesser end 32 and a closed greater end 34. The closed greater end 34 has an end panel 36. The dispenser 20 has an inlet aperture 40 allowing passage of air inward toward a channel 38 (depicted in FIG. 4) which channel 38 extends from the open lesser end 32 to the panel 36 of closed greater end 34.

Figure 2:
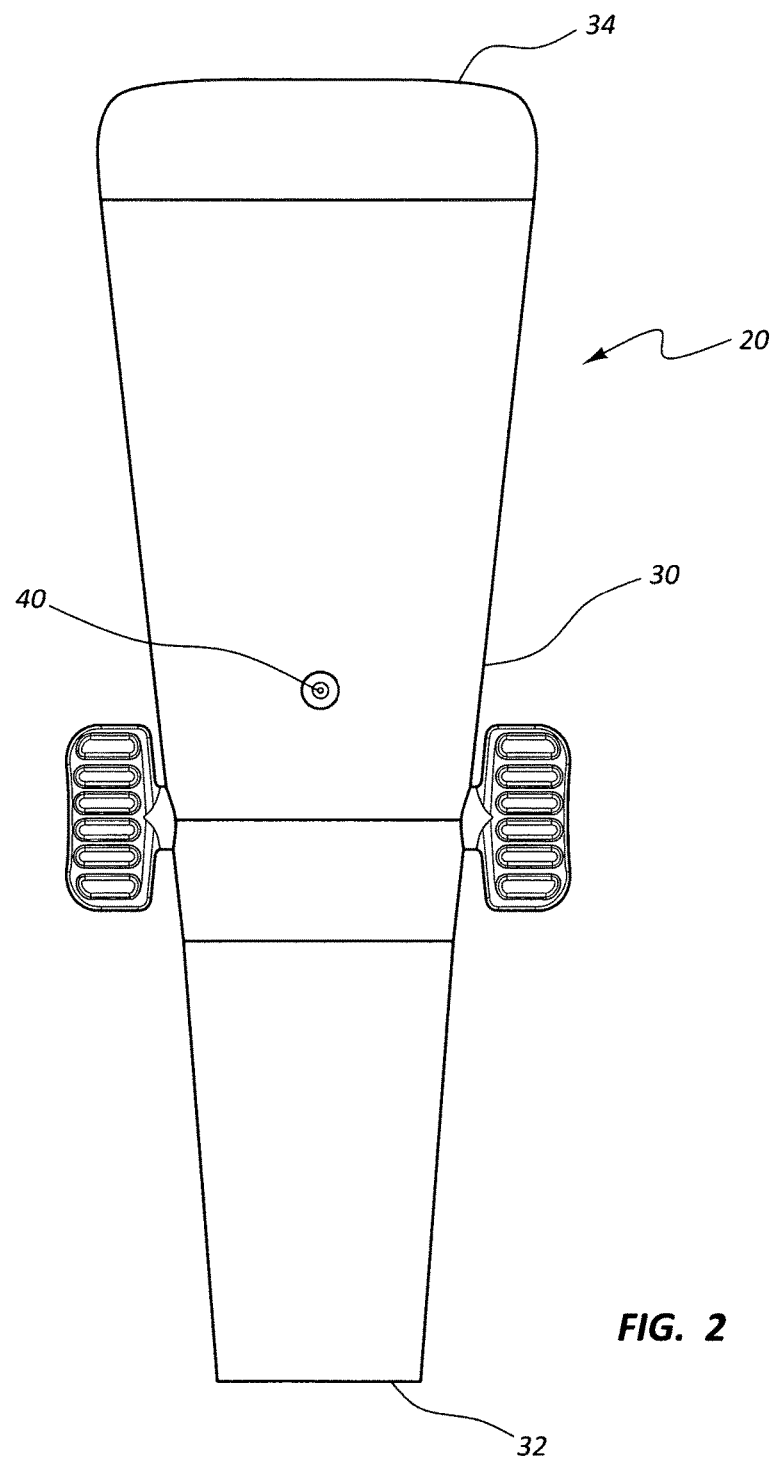
FIG. 2 schematically shows a front view of the dispenser of FIG. 1.
Figure 3:
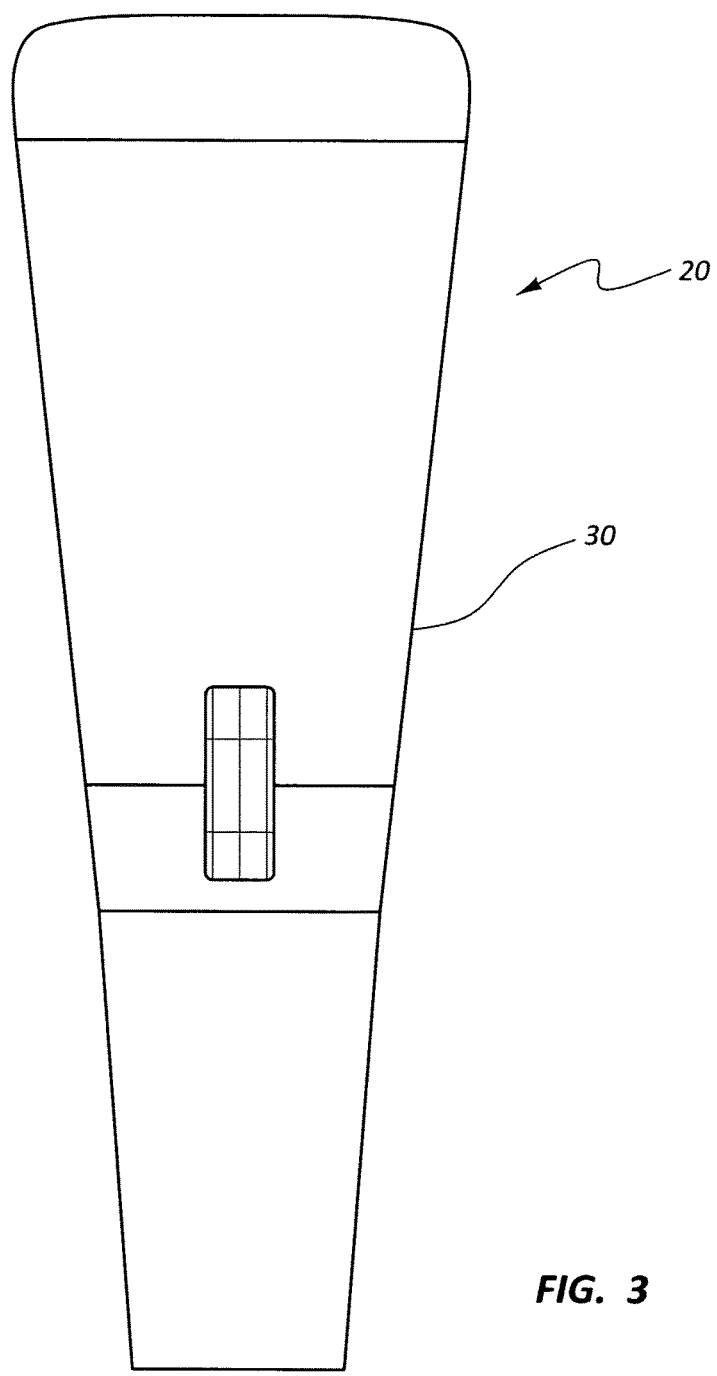
FIG. 3 schematically shows a side view of the dispenser of FIG. 1.

As depicted in FIG. 2 and FIG. 3, the dispenser 20 has a frustoconical body 30.

Figure 4:
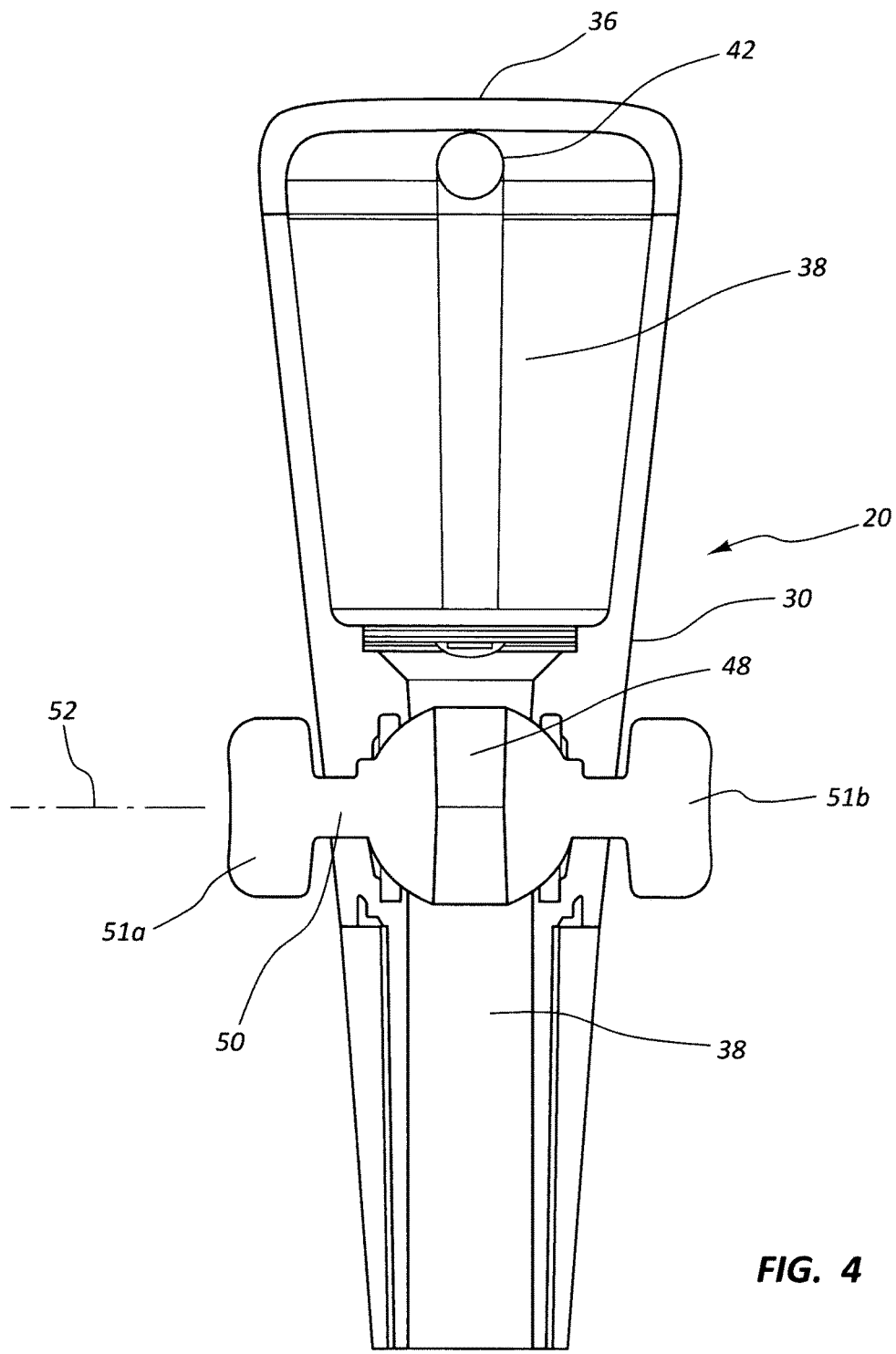
FIG. 4 is a sectional view of the dispenser of FIG. 1 at A-A of FIG. 3, and schematically depicting the valve in a first open position; and, FIG. 5 shows an exploded isometric view of the dispenser of FIG. 1, also schematically depicting the valve in the first open position.

As depicted in FIG. 4, the earlier mentioned channel 38 extends from open lesser end 32 to end panel 36 of closed greater end 34. A ball valve 44 is situated between the inlet aperture 40 and the open lesser end 32 and has a ball 46 with a passage 48, actuator 50 extending from the ball 46 to indicator handles 51a and 51b. The ball valve 44 also includes seals 47, which allow the ball valve 44 to rotate about axis 52 such that the ball valve 44 may be in a first open position, with the passage 48 aligned with and maintaining the channel 38 or in a second closed position, such that the passage is unavailable and unaligned with the channel 38 and thereby interrupts the channel 38.

Preferably, the indicator handles 51a and 51b at the ends of actuator 50 are aligned with the passage 48 of the ball 46 of the ball valve 44 and serve as an indicator, both visual and tactile of the open or closed status of the ball valve 44. Preferably, both indicator handles 51a and 51b are present, such that it is convenient for one grasping a wine bottle with the dispenser 20 sealed within the neck of the wine bottle with a first hand to tactilly check the valve status with an opposite second hand and if the desired valve status is not present, to rotate the ball valve 44 to the desired position. Due to the dispenser 20 having two indicator handles 51a and 51b present, the handedness, whether right handed or left handed, of the individual person dispensing wine through the dispenser 20 is eliminated as a concern.

Figure 5:
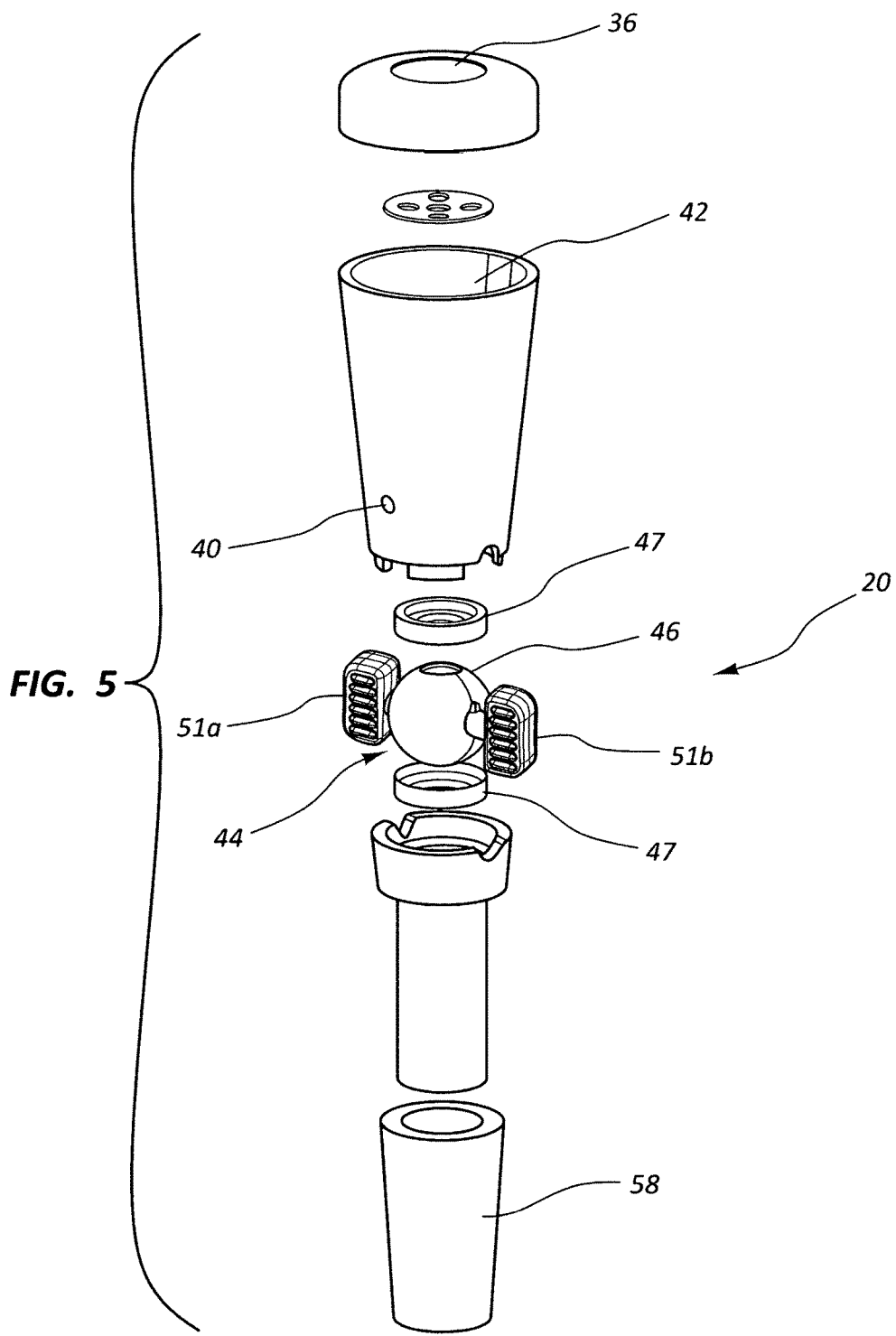

As depicted in FIG. 5, a resilient frustoconical sleeve segment 58 is present at or adjacent to the open lesser end 32 of the dispenser 20. When the open lesser end 32 is inserted into the open neck end of a wine bottle, the resilient frustoconical sleeve segment 58 facilitates establishing a seal between the dispenser 20 and the open neck of the wine bottle.

When a wine bottle is freshly uncorked, the dispenser 20 may be inserted in the open neck of the bottle and provide a pour path for the wine to be dispensed. The pour path is defined as traveling through the channel 38, maintained by the ball valve 44 in a first open position, and onward toward the closed greater end, thence exiting the dispenser 20 at the outlet aperture 42. During passage through the pour path, air entering through the inlet aperture 40 mixes and interacts with the wine so as to aerate the wine. This serves to reduce the time required for the wine to properly breathe and achieve its most desirable flavor. Preferably, the cross sectional area of the inlet aperture 40 is not more than about half of the cross sectional area of the outlet aperture 42. This relationship between the cross sectional area of the inlet aperture 40 and the outlet aperture 42 increases the relative velocity of the air entering relative to wine exiting and also discourages wine from inadvertently exiting through the inlet aperture 40.

The dispenser 20 when sealed to the top of a freshly uncorked bottle of wine also may serve to preserve the fresh characteristics of the wine if the ball valve 44 is set to the second closed position due to preventing air flow into the wine bottle. Subsequently, when dispensing of wine may be again desired, the wine to be dispensed is nearly in the same condition as when the wine bottle was first uncorked.

Preferably, but optionally, either or both of the closed greater end 34 of the dispenser 20, in particular end panel 36, and/or the frustoconical body adjacent the closed greater end 34 includes indicia, such as, for example, instructions and/or advertising and/or personalized information recorded concerning the wine in the bottle.

One of ordinary skill will recognize that various modifications can be made to the present invention without departing from the spirit of the invention.

What is claimed is:

1. A dispenser for dispensing a beverage from a beverage bottle having a necked opening, the dispenser comprising:
    (a) a hollow frustoconical body having a sidewall, the frustoconical body having a first end and a second end, the first end having less diameter than the second end, the first end being open and defining an open lesser end, the second end having more diameter than the first end and being closed to define a closed greater end, the open lesser end being adapted to be inserted into the necked opening of the beverage bottle;
    (b) a channel within the frustoconical body leading from the open lesser end to a distal end adjacent to the closed greater end to provide a pour path;
    (c) an inlet aperture within the sidewall of the frustoconical body leading to the channel, the inlet aperture being situated between the open lesser end and the closed greater end of the frustoconical body;
    (d) an outlet aperture within the sidewall of the frustoconical body connected to the distal end of the channel, the outlet aperture being situated adjacent the closed greater end of the frustoconical body; and
    (e) a valve situated along the channel between the open lesser end of the frustoconical body and the inlet aperture, the valve having a first open position and a second closed position, the first open position maintaining the channel leading from the open lesser end to the closed greater end of the frustoconical body, the second closed position interrupting the channel leading from the open lesser end to the closed greater end;

(f) wherein when the valve is placed in the first open position and the bottle is inverted, the beverage passing through the pour path of the channel to the outlet aperture is exposed to a gas passing through the inlet aperture to the channel to comingle with the beverage traveling through the channel; and (g) wherein when the valve is placed in the second closed position, the beverage contained inside the bottle is not exposed to the gas.

2. The dispenser of claim 1, wherein the open lesser end of the frustoconical body is sheathed in a resilient sleeve segment and wherein the resilient sleeve segment functions to form a seal between the open lesser end of the dispenser and the necked opening of the beverage bottle into which the open lesser end of the frustoconical body of the dispenser is inserted.

3. The dispenser of claim 1, wherein the beverage contained inside the bottle is wine.

4. The dispenser of claim 3, wherein the bottle has been freshly uncorked and the wine contained inside the bottle has yet to breath, the gas introduced into the channel through the inlet aperture being air so that the wine dispensed through the pour path via the opened valve contacting the air passing through the inlet aperture to cause aeration of the wine inside the pour path.

5. The dispenser of claim 3, wherein the closed valve enables the dispenser to serve as a temporary replacement closure for the wine bottle to protect the wine contained inside the bottle from spoilage by the air outside the bottle.

6. The dispenser of claim 1, wherein the valve is a ball valve, the ball valve having an actuator extending from the frustoconical body, the actuator serving to move the ball valve from the first open position to the second closed position or from the second closed position to the first open position.

7. The dispenser of claim 6, wherein the actuator has an indicator handle, the indicator handle providing a visual indication of whether the ball valve is in the first open position or the second closed position.

8. The dispenser of claim 7, wherein the ball valve has a first end and a second end and wherein the actuator of the ball valve extends from the first end and the second end of the ball valve and the indicator handle is one of a pair of indicator handles, each situated on opposite ends of the ball valve.

9. The dispenser of claim 7, wherein the inlet aperture and the outlet aperture are situated on opposite sides of the channel and the actuator and ball valve are situated along an axis substantially perpendicular to a plane defined by the channel, the inlet aperture and the outlet aperture.

10. The dispenser of claim 1, wherein the inlet aperture and the outlet aperture are situated on opposite sides of the channel within the frustoconical body.

11. The dispenser of claim 1, wherein the inlet aperture has a cross sectional area and the outlet aperture has a cross sectional area, and wherein the cross sectional area of the inlet aperture is not more than about half of the cross sectional area of the outlet aperture.

12. The dispenser of claim 1, wherein the closed greater end of the dispenser further includes indicia.

13. The dispenser of claim 1, wherein the frustoconical body adjacent to the closed greater end includes indicia.

14. A method of dispensing wine from a freshly uncorked wine bottle, the wine bottle having an open neck, the method comprising the steps of:

(a) providing a dispenser, the dispenser having:
(i) a hollow frustoconical body having a sidewall, the frustoconical body having a first end and a second end, the first end having less diameter than the second end, the first end being open and defining an open lesser end, the second end having more diameter than the first end and being closed to define a closed greater end with the open lesser end being adapted for insertion into the open neck of the wine bottle and having a resilient sleeve segment sheathing the frustoconical body adjacent the open lesser end;
(ii) a channel within the frustoconical body leading from the open lesser end to a distal end adjacent to the closed greater end to provide a pour path;
(iii) an inlet aperture within the sidewall of the frustoconical body leading to the channel, the inlet aperture being situated between the open lesser end and the closed greater end of the frustoconical body;
(iv) an outlet aperture within the sidewall of the frustoconical body connected to the distal end of the channel, the outlet aperture being situated adjacent the closed greater end of the frustoconical body; and,
(v) a valve situated along the channel between the open lesser end of the frustoconical body and the inlet aperture, the valve having a first open position and a second closed position, the first open position maintaining the channel leading from the open lesser end to the closed greater end of the frustoconical body, the second closed position interrupting the channel leading from the open lesser end to the closed greater end;

(b) inserting the open lesser end of the wine dispenser into the neck of the wine bottle and establishing a seal by compressing the resilient sleeve between the frustoconical body adjacent the open lesser end and the neck of the wine bottle;

(c) inverting the wine bottle such that wine from the newly opened wine bottle passes into the pour path extending through the channel and thence through the outlet aperture, and while passing through the pour path the wine encounters air passing into the pour path from the inlet aperture; and (d) wherein the wine from the newly opened wine bottle is aerated such that breathing time period is reduced.

15. The method of dispensing wine of claim 1 further comprising the step of:

(e) placing the valve in the second closed position, such that the channel is interrupted and the wine does not pass through the pour path, and air is temporarily substantially prevented from contacting any residual portion of the wine remaining in the freshly opened wine bottle, such that the wine is temporarily preserved for later aeration and breathing.

16. The method of dispensing wine of claim 15 further comprising the step of:

(f) placing the valve in the first open position, such that the channel is maintained and the wine does pass through the pour path, and contacts air from the inlet aperture to aerate the wine passing through the pour path.

17. The method of dispensing wine of claim 15, wherein the valve is a ball valve, the ball valve having an actuator and an indicator handle on the actuator and further comprising the steps of:

(f) holding the wine bottle with the dispenser sealed thereto with a first hand; and, (g) wherein the step of placing the valve in the second closed position is performed by actuating the indicator handle and actuator with a second opposite hand.

18. The method of dispensing wine of claim 14, wherein the valve is a ball valve, the ball valve having an actuator and an indicator handle on the actuator and further comprising the steps of:
(e) holding the wine bottle with the dispenser sealed thereto with a first hand; and,
(f) wherein the step of placing the valve in the first open position is performed by actuating the indicator handle and actuator with a second opposite hand.

\* \* \* \* \*